(12) United States Patent
Yu et al.

(10) Patent No.: US 7,599,264 B2
(45) Date of Patent: Oct. 6, 2009

(54) OPTICAL DRIVE SPIN RATE CONTROL

(75) Inventors: James Tse-Ching Yu, Woodinville, WA (US); Jason M. Anderson, Snoqualmie, WA (US); Raju Ramanathan, Redmond, WA (US); Yingchun Simon Zhang, Redmond, WA (US); Kenneth Wade Stufflebeam, Jr., Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 752 days.

(21) Appl. No.: 11/090,772

(22) Filed: Mar. 24, 2005

(65) Prior Publication Data
US 2006/0215501 A1    Sep. 28, 2006

(51) Int. Cl.
*G11B 7/00* (2006.01)

(52) U.S. Cl. .................... 369/47.47; 369/47.38

(58) Field of Classification Search .................. None
See application file for complete search history.

(56) References Cited

U.S. PATENT DOCUMENTS

| 6,545,964 B1 * | 4/2003 | Takase et al. ............ 369/47.51 |
| 2002/0181356 A1 * | 12/2002 | Watanabe et al. ........ 369/47.16 |

* cited by examiner

*Primary Examiner*—Joseph Feild
*Assistant Examiner*—Joseph Haley
(74) *Attorney, Agent, or Firm*—Workman Nydegger

(57) ABSTRACT

A method and system for controlling the spin rate of an optical device. A device driver provides notification that media has been inserted into the optical device. A control service determines the format of information on the media. The spin rate of the optical device is locked or unlocked based on the format.

12 Claims, 5 Drawing Sheets

OPTICAL DRIVE SPIN RATE CONTROL

FIELD OF THE INVENTION

The invention relates generally to computers, and more particularly to controlling storage devices.

BACKGROUND

As the functionality of personal computers begins to converge with that of consumer electronics, personal computers are beginning to be used in place of traditional consumer electronic devices. For example, a personal computer may be connected to home entertainment components including a television, speakers, stereo receiver, and set-top box to perform the functions traditionally associated with specialized consumer electronics such as DVD and CD players, digital video recorders, stereo components, and the like.

Consumers often expect little or no noticeable noise from consumer electronic devices when such devices are in operation. For personal computers, on the other hand, consumers have come to expect significant noise, particularly as the personal computers perform certain operations.

Most of the new optical drives installed on personal computers are capable of performing data transfer at speeds that far exceed those capable by consumer electronic devices. For example, a personal computer's CD drive may read data on a CD 40 times or faster than the speed that a consumer electronics CD player does. Similarly, a personal computer's DVD drive may read data from a DVD at 8 times or faster than a consumer electronics DVD player. These faster transfer rates are accomplished by turning the media faster. Upon inserting media into a personal computer's optical drive, the drive may spin up to its maximum speed to read the data off the media. When doing so, the drive may create a high volume of noise due to the mechanics and physics of the drive.

What is needed is a method and system of decreasing the noise produced by optical drives of personal computers. Ideally, such a method and system would not suffer in performance when reading data files not normally contained on consumer electronics media.

SUMMARY

Briefly, the present invention provides a method and system for controlling the spin rate of an optical device. A device driver provides notification that media has been inserted into the optical device. A control service determines the format of information on the media. The spin rate of the optical device is locked or unlocked based on the format.

In one aspect, if the media includes multimedia files only, the spin rate is locked at a speed compatible (e.g., capable of playing without pauses) to the multimedia files.

In another aspect, if the media includes data files that are not multimedia files, the spin rate of the optical device is unlocked (e.g., the optical device is allowed to access the media at its maximum rate).

In another aspect, if the media includes data files and multimedia files, the spin rate of the optical device may be locked or unlocked based on heuristics.

In another aspect, an application may override the spin rate lock set by the control service.

Other aspects will become apparent from the following detailed description when taken in conjunction with the drawings, in which:

DETAILED DESCRIPTION

Exemplary Operating Environment

Figure 1:
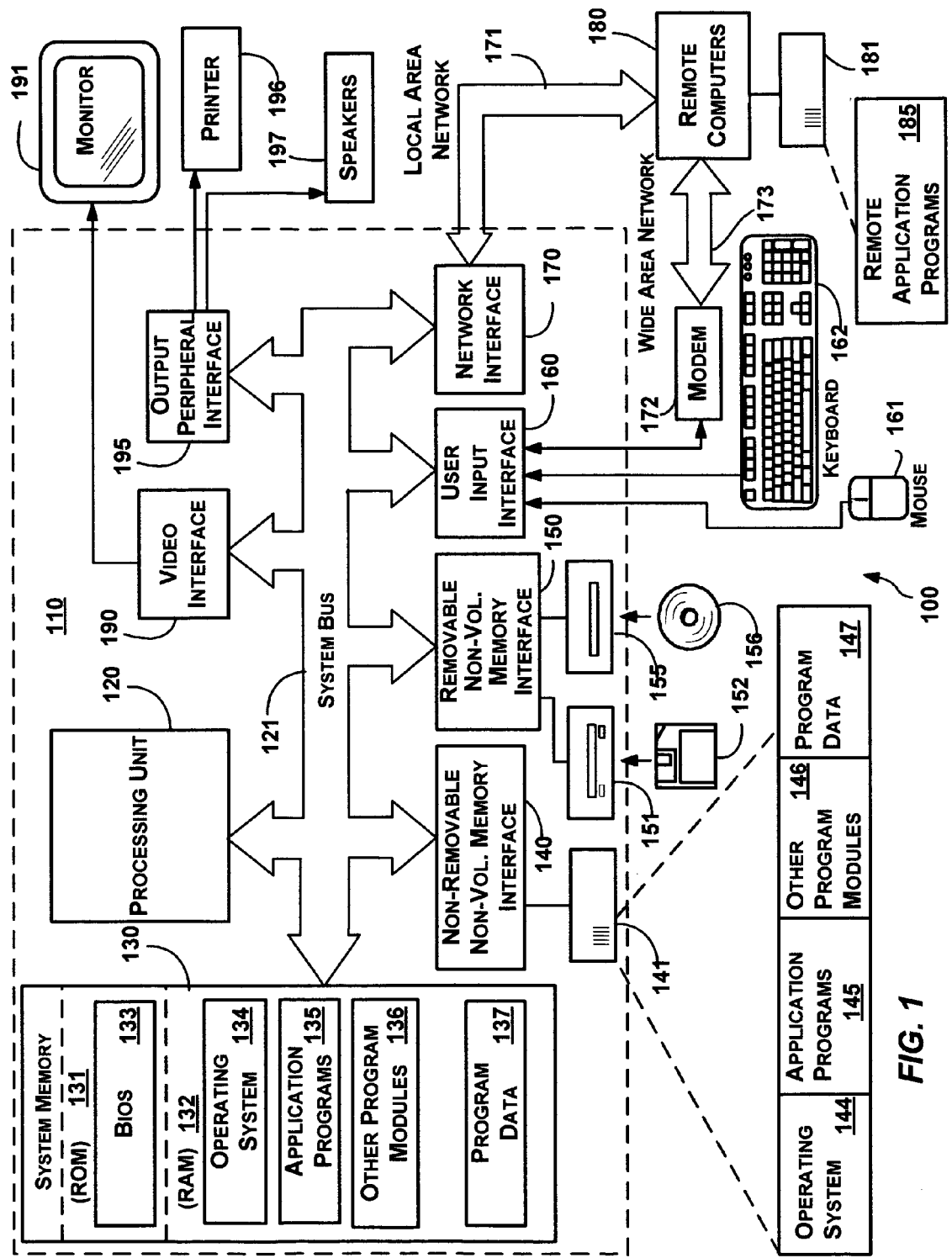
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Optical Drive Spin Rate Control

Figure 2:
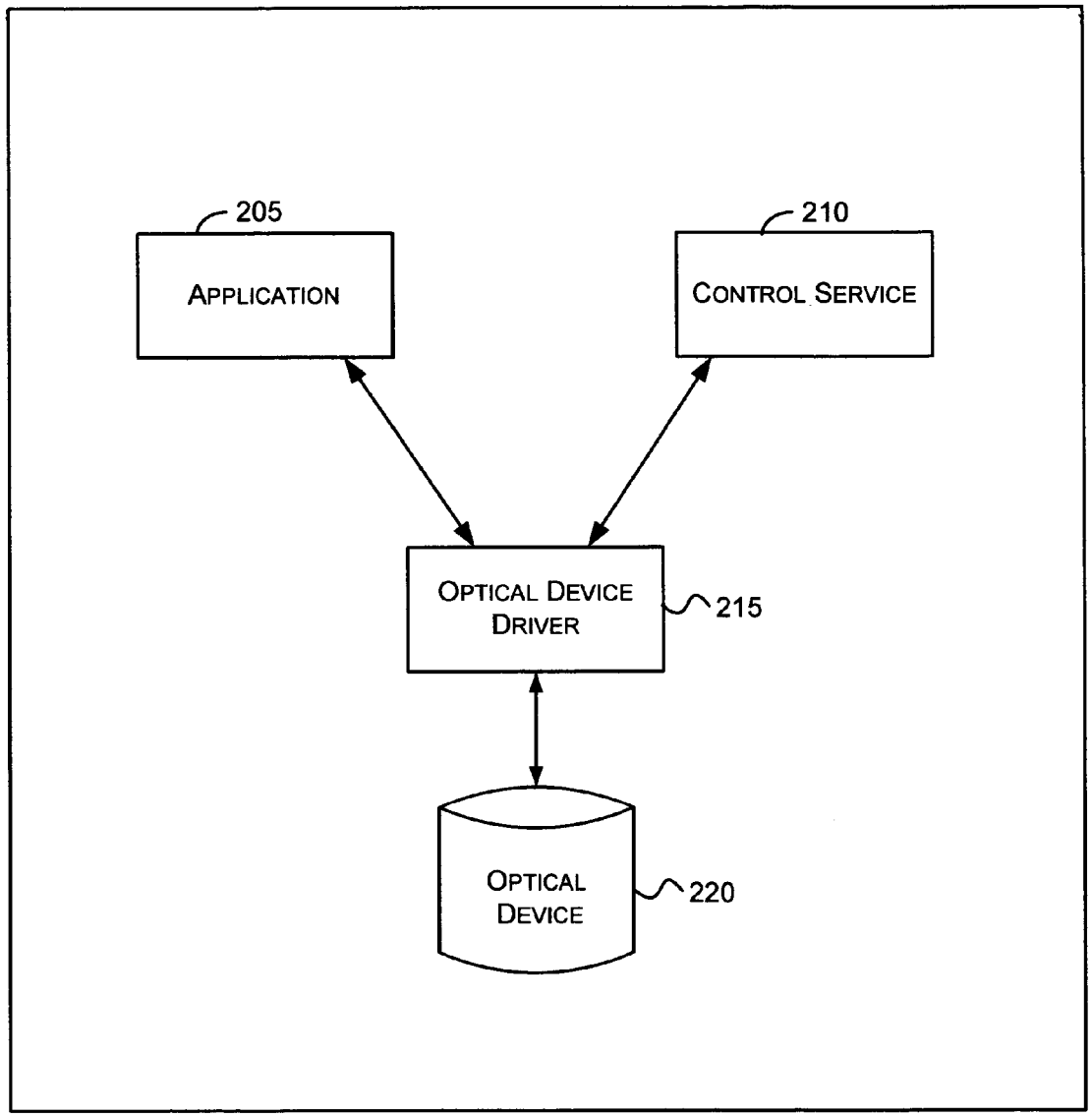
FIG. 2 is a block diagram representing an exemplary environment in which the present invention may operate in accordance with various aspects of the invention.

FIG. 2 is a block diagram representing an exemplary environment in which the present invention may operate in accordance with various aspects of the invention. The environment includes an application 205, a control service 210, an optical device driver 215, and an optical device 220.

The application 205 is a user-mode or kernel-mode process that executes in the environment and that attempts to read from the optical device 220. The control service 210 is a user-mode or kernel-mode process that determines the spin rate of the optical device 220. The control service 210 may register with the optical device driver 215 to be informed when media is inserted into the optical device 220. The control service 210 may also instruct optical device driver 215 to lock the spin rate of the optical device 220 at a particular speed (e.g., 1×, 2×, 4×, or some other rate), depending on what is contained in the media inserted into the optical device. For example, if the media contains data in a multimedia format, the control service 210 may instruct the optical device driver 215 to lock the spin rate of the optical device 220 at 1× or 2× to reduce noise, save battery power, and so forth.

Determining whether the media contains data in a multimedia format may involve various heuristics. For example, if the media includes data formatted as a picture CD, video CD, in red book audio, DVD audio, or some other audio format, in DVD movie format, or in some other industry-defined multimedia format, the control service 210 may determine that the media is in multimedia format and may act accordingly.

If a media includes data files and multimedia files (hereinafter "mixed-mode media"), the percentage of multimedia files to data files may be used to determine whether to lock the optical device 220 at a particular spin rate. For example, in a mixed-mode media if the percentage of multimedia files exceeds a threshold (e.g., 90%), the control service 210 may determine that the optical drive should be locked at a particular spin rate. Multimedia files may include files having extensions such as .JPG, .AVI, .TIFF, .BMP, .WAV, .MP3, .WMA, and other extensions that indicate audio or visual data. When a mixed-mode media includes files that need different access rates (e.g., 150 Kbs, 750 Kbs, 1500 Kbs, etc.), the control service 210 may cause the spin rate of the optical device 220 to be locked at a spin rate that allows the file with the highest access rate to be played (e.g., 1500 Kbs).

In one embodiment, when a mixed-mode media is in the optical device 220, the control service 210 causes the spin rate of the optical media to be locked at a particular spin rate until an application accesses data that is not in multimedia format (e.g., a word processing document, spreadsheet document, or the like). After an application accesses data that is not in multimedia format, the spin rate may be unlocked and may or may not be locked again even if later a multimedia format file is accessed on the media.

In another embodiment, based on its needs, the application 205 may instruct the optical device driver 215 to lock the spin rate of the optical device 220 at a particular rate. For example, the application 205 may instruct the optical device driver 215 to lock the spin rate of the optical device 220 at a rate selected by the application. When an application 205 instructs the optical device driver 215 to lock or unlock the spin rate of the optical device 220, this may override a spin rate lock or unlock set by the control service 210.

If more than one application instructs the optical device driver 215 to lock or unlock the spin rate of the optical device 220, the spin rate of the optical device 220 may depend on the last instruction received by the optical device driver 215. For example, if one application instructs the optical device driver 215 to lock the spin rate at one rate, and later another application instructs the optical device driver 215 to lock the spin rate at another rate, the optical device driver 215 may lock the spin rate of the optical device 220 at the one rate until the second instruction to lock at the other rate is received. Then, the optical device driver 215 may lock the spin rate of the optical device 220 at the other rate. The spin rate may remain locked at the other rate until an application requests that the optical device driver 215 lock or unlock the spin rate or until new media is inserted into the optical device 220.

If an application opens the optical device 220 for exclusive access and instructs the optical device driver 215 to lock the spin rate of the optical device 220, the optical device driver 215 may lock the spin rate of the optical device 220 at the requested rate and may ignore subsequent requests from other applications until the first application releases its exclusive access to the optical device 220.

If no application has requested that the spin rate of the optical device 220 be locked at a specified rate, the control service 210 may determine whether to lock or unlock the spin rate of the optical device 220 depending on the format of data in the media inside the optical device 220. If the control service 210 determines that the optical device may have its spin rate unlocked, the control service 210 instructs the optical device driver 215 to unlock the spin rate of the optical device 220. The optical device 220 may then spin at its maximum rate until new media is inserted therein or an application subsequently locks the spin rate Locking or unlocking the spin rate of the optical device 220 via the control service 210 typically occurs shortly after media is inserted into the optical device 220.

The control service 210 and the application 205 may communicate with the optical device driver 215 through an application programming interface (API) of the optical device driver 215.

It will be recognized that the control service 210 allows the optical device 220 to be spin rate locked even if no applications are aware of this feature. Thus, installing the control service 210 in an existing environment may provide the benefits of spin rate locking and unlocking without requiring that all the applications in the existing environment be updated.

The optical device driver 215 may comprise a kernel-mode or user-mode process that may be used to access data on the optical device 220. The optical device driver 215 may inform any applications (including the application 205 and the control service 210) that have registered with it when media has been inserted in the optical device 220. As previously mentioned, the optical device driver 215 may also lock or unlock the spin rate of the optical device 220 in accordance with instructions received from other processes.

The optical device 220 includes any device that may be used to access optical or optical/magnetic media including a CD, CDRW, DVD, or DVDRW drive, for example. It will be recognized that aspects of the invention may also be applicable to other devices that have controllable spin rates and that may need to spin slower to reduce noise or for other reasons.

Figure 3:
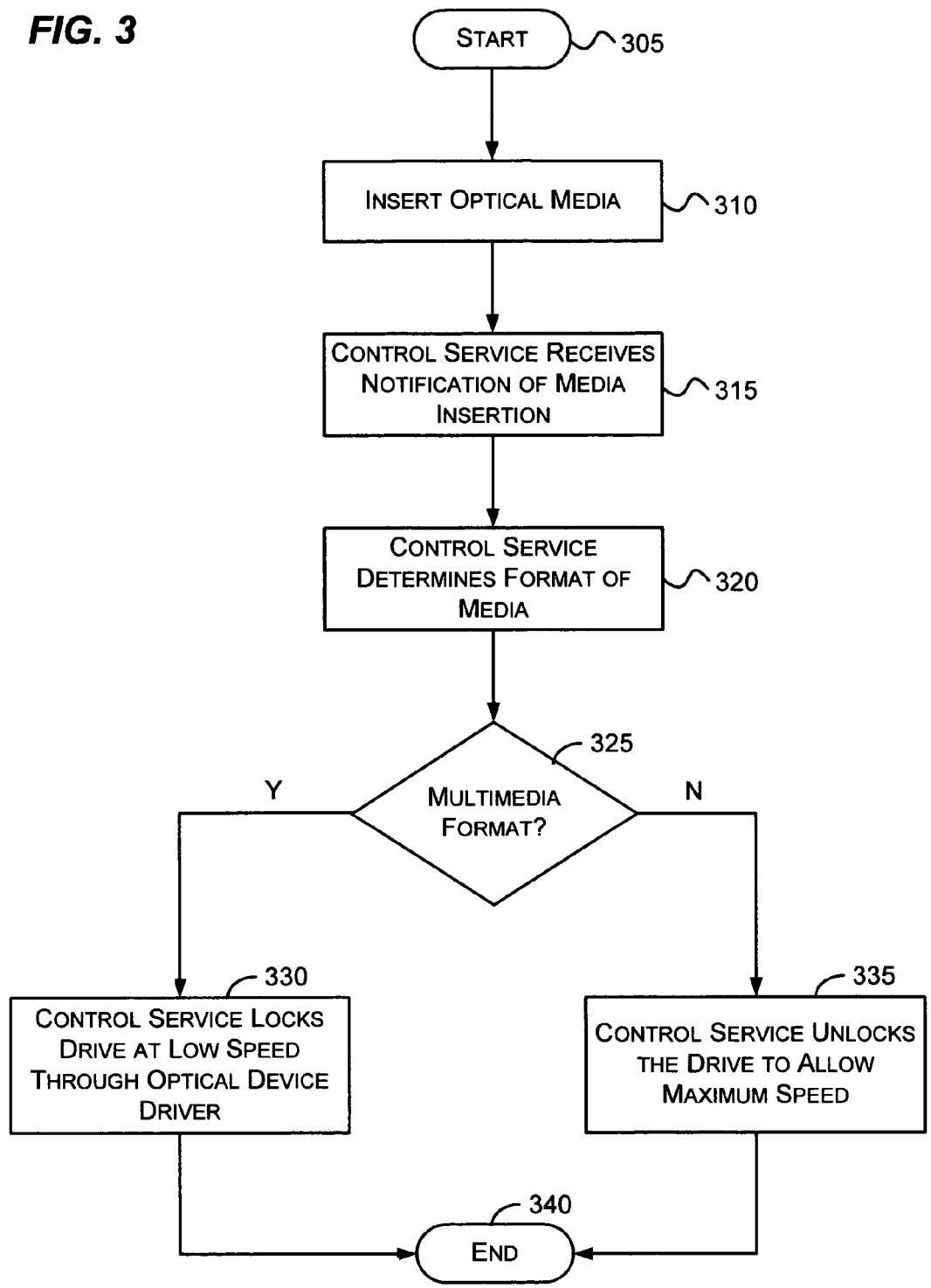
FIG. 3 is a flow diagram that generally represents actions that may occur in controlling the spin rate of an optical device in accordance with various aspects of the invention.

FIG. 3 is a flow diagram that generally represents actions that may occur in controlling the spin rate of an optical device in accordance with various aspects of the invention. At block 305, the actions commence.

At block 310, media is inserted into the optical device. For example, a DVD or CD is inserted into an optical device.

At block 315, the control service receives notification that media has been inserted into the optical device. The control service may receive this notification from an optical device driver, for example.

At block 320, the control service determines the format of the media. If the format is an industry- or otherwise-defined multimedia format, the control service may determine that that the media is in multimedia format. If so, at block 325, processing branches to block 330; otherwise, processing branches to block 335. If the media is in mixed-mode, the control service may determine that the media is not in multimedia format and processing may branch to block 335.

At block 330, the control service locks the drive at a low speed compatible with the multimedia format (e.g., 1×) via the optical device driver. At block 335, the control service unlocks the drive to allow maximum speed. At block 340, the actions end. The actions above may be repeated each time media is inserted into the optical device.

Figure 4:
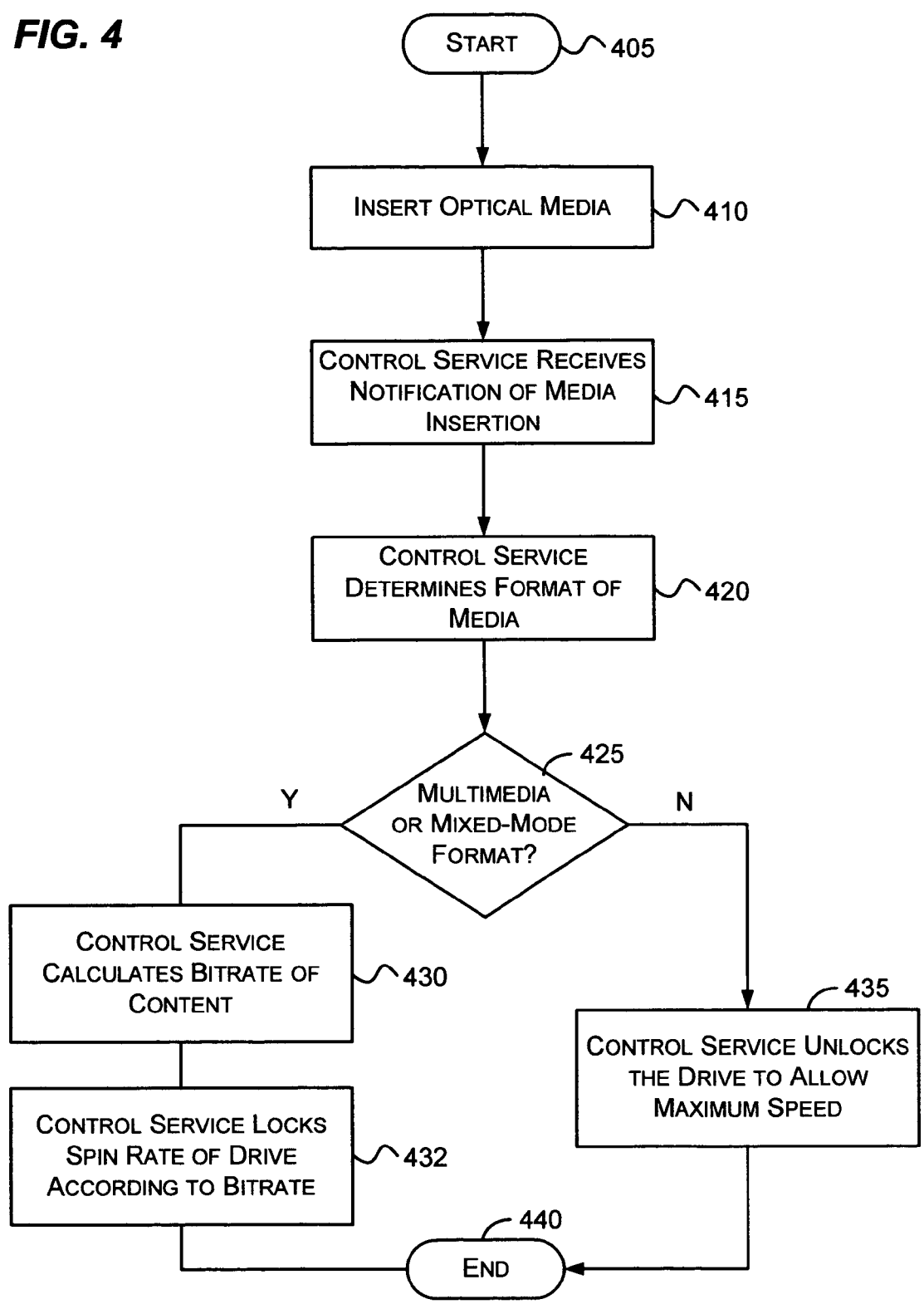
FIG. 4 is a flow diagram that generally represents other actions that may occur in controlling the spin rate of an optical device in accordance with various aspects of the invention.

FIG. 4 is a flow diagram that generally represents other actions that may occur in controlling the spin rate of an optical device in accordance with various aspects of the invention. At block 405, the actions commence.

At block 410, media is inserted into the optical device. For example, a DVD or CD is inserted into an optical device.

At block 415, the control service receives notification that media has been inserted into the optical device. The control service may receive this notification from an optical device driver, for example.

At block 420, the control service determines the format of the media. If the format is an industry- or otherwise-defined multimedia format or mixed-mode media format that is significantly multimedia (e.g., by percentage of multimedia files), the control service may determine that the optical drive should be spin rate locked. If so, at block 425, processing branches to block 430; otherwise, processing branches to block 435.

At block 430, the control service calculates a bitrate of the content on the media. If the media contains multimedia files of a single type (e.g., MP3), the control service may determine the bitrate needed to play the files. If the media contains non-homogenous multimedia files, the control service may determine the bitrate by finding the maximum bitrate that any of the multimedia files needs to be played correctly. In some multimedia files, the needed bitrates may be found in the headers of the multimedia files. In other multimedia files, the type of file as indicated by its extension determines the bitrate the file needs.

If the bitrate needed to play a file is between two bitrates that are supported by the optical device, the control service may determine that the higher bitrate of the optical device should be used. For example, if an optical device supports 150 Kbps and 300 Kbps bitrates and multimedia files on the media need to be read no slower than 200 Kbps to play correctly, the control service may determine that 300 Kbps should be used on the optical device.

At block 432, the control service locks the spin rate of the drive according to the determined bitrate.

At block 435, the control service unlocks the drive to allow maximum speed. At block 440, the actions end. The actions above may be repeated each time media is inserted into the optical device.

Figure 5:
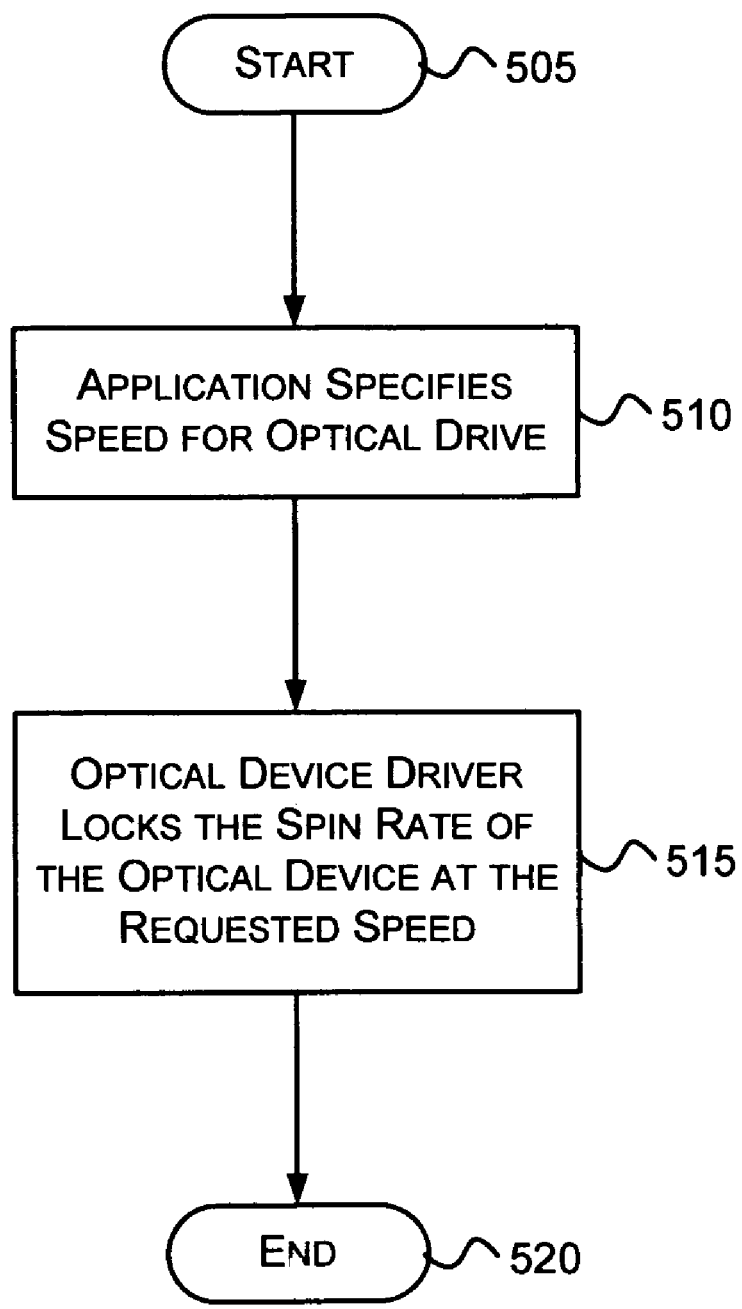
FIG. 5 is a flow diagram that generally represents actions that may occur in controlling the spin rate of an optical device when an application requests a specific speed in accordance with various aspects of the invention.

FIG. 5 is a flow diagram that generally represents actions that may occur in controlling the spin rate of an optical device when an application requests a specific speed in accordance with various aspects of the invention. At block 505, the actions commence.

At block 510, the application specifies a speed for the optical drive. The application may specify a particular bitrate (e.g., 1500 Kbps) or a multiple of an industry standard (e.g., 1×, 2×, etc.).

At block 515, the optical device driver locks the speed of the optical drive to the requested speed and overrides any previous spin rate. If the optical drive is not capable of playing information at the speed requested by the application (e.g., the speed falls between two allowed speeds), the optical device driver may lock the spin rate of the optical device at a higher speed (e.g., the higher of the two speeds).

In another embodiment of the invention, the application locks the speed of the optical device by communicating directly with the optical device driver.

At block 520, the actions end. The actions represented in FIG. 5 may occur asynchronously with respect to the actions represented in FIG. 3 or 4. If they occur before the control service has locked or unlocked an optical drive, the control service may not perform any other actions it would have performed in FIG. 3 or 4. If the actions represented in FIG. 5 occur after the actions represented in FIG. 3 or 4, the control service locks the optical device at the speed specified.

It will be readily recognized that various aspects of the invention have various advantages. One advantage relates to noise reduction. Locking the spin rate of an optical device may reduce the noise emitted by the optical device. This may make it more practical and pleasing to consumers to replace a specialized consumer electronic device or devices with a personal computer.

Another advantage relates to power consumed by the optical device. An optical device may consume less power if it is locked at a slower rate. This may be important in portable computers that rely on batteries for power. For example, a portable computer may be able to play all of a multimedia DVD or CD or may be able to stay on longer between recharging if the optical device is locked at a slower speed.

Another advantage relates to latency in accessing data on optical media. When a drive is spin rate locked, it may not need to accelerate its spin rate to its maximum speed before accessing data on the drive. Accelerating the spin rate to the maximum speed takes some time and may introduce unacceptable or annoying latencies—particularly right after media is inserted into the optical drive. By allowing the drive to accelerate to only a fraction of its maximum speed, the latency in accessing data on the drive, particularly at spin-up, may be reduced.

Another advantage relates to longevity of the optical device. Spinning an optical device at a speed less than its maximum speed may lengthen the lifetime of the optical device.

Another advantage relates to error correction. Spinning optical media at an accelerated rate may introduce the need for more error correction than spinning the media at a slower rate. By locking the spin rate at a slower speed, less error correction may be needed.

Fewer, more, or other advantages may also be realized by various aspects of the present invention without departing from the spirit or scope of the present invention.

As can be seen from the foregoing detailed description, there is provided a method and system for controlling the spin rate of an optical device. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions which, when executed, implement a method comprising:

receiving a notification that media is inserted into an optical drive;

determining a format of information on the media wherein the media includes data files and multimedia files;

based on the format of the information, determining that a percentage of the multimedia files to data files is greater than or equal to a threshold; and upon determining that the percentage of the multimedia files to data files is greater than or equal to the threshold, controlling a spin rate of the optical drive by locking the spin rate of the optical drive to a spin rate compatible with the multimedia files, wherein the spin rate compatible with the multimedia files is less than a maximum spin rate of the optical drive.

2. The computer-readable storage medium of claim 1, wherein each multimedia file has a minimum speed at which it is played correctly, and wherein controlling a spin rate of the optical drive based on the format comprises locking the spin rate of the optical drive at a speed no less than the minimum speed of any of the files.

3. The computer-readable storage medium of claim 1, further comprising: wherein if the percentage of the multimedia to data files is less than the threshold, controlling a spin rate of the optical drive based on the format comprises unlocking the spin rate of the optical drive to allow the optical drive to spin at its maximum rate.

4. The computer-readable storage medium of claim 1, further comprising receiving a request to access one of the data files and thereafter unlocking the spin rate of the optical drive.

5. A method for controlling an optical drive, comprising:
receiving a notification that media is inserted into an optical drive;
determining a format of information on the media wherein the media includes data files and multimedia files; and
based on the format of the information, determining that a percentage of the multimedia files to data files is greater than or equal to a threshold; and
upon determining that the percentage of the multimedia files to data files is greater than or equal to the threshold, controlling a spin rate of the optical drive by locking the spin rate of the optical drive to a spin rate compatible with the multimedia files, wherein the spin rate compatible with the multimedia files is less than a maximum spin rate of the optical drive.

6. The method of claim 5, further comprising:
receiving a spin rate from an application that seeks to access the optical drive; and
controlling the spin rate of the optical drive based on the spin rate received from the application such that the spin rate of the optical drive is locked at a spin rate received from the application.

7. The method of claim 6, wherein receiving a spin rate from an application that seeks to access the optical drive comprises receiving the spin rate via an application programming interface of an optical device driver that controls the spin rate of the optical drive.

8. The method of claim 6, wherein controlling the spin rate of the optical drive based on the spin rate received from the application comprises determining another spin rate at which the optical drive is capable of being accessed, wherein the other spin rate is no less than the spin rate received from the application, and locking the spin rate of the optical drive at the other spin rate.

9. The method of claim 8, wherein the optical drive is capable of being accessed at a plurality of spin rates including the other spin rate, and wherein the other spin rate is the closest of the plurality of spin rates to the spin rate received from the application.

10. The method of claim 6, further comprising receiving another spin rate from another application and locking the spin rate of the optical drive based on the other spin rate.

11. The method of claim 6, wherein the application opens the optical drive for exclusive access and further comprising receiving another spin rate from another application and ignoring the other spin rate.

12. The method of claim 6, wherein receiving a spin rate from an application that seeks to access the optical drive comprises receiving the spin rate at a kernel-mode driver that provides access to the optical drive, wherein the kernel-mode driver is capable of locking the spin rate of the optical drive.

* * * * *